United States Patent [19]

Shih

[11] Patent Number: 5,018,093

[45] Date of Patent: May 21, 1991

[54] HIGH PERFORMANCE SELF-CHECKING ADDER HAVING SMALL CIRCUIT AREA

[75] Inventor: Feng-Hsien W. Shih, Yorktown Heights, N.Y.

[73] Assignee: IBM Corporation, N.Y.

[21] Appl. No.: 459,872

[22] Filed: Jan. 2, 1990

[51] Int. Cl.$^5$ .................... G06F 11/16; G06F 7/50
[52] U.S. Cl. ................................ 364/740; 364/741; 364/788
[58] Field of Search ............... 364/740, 741, 737, 788

[56] References Cited

U.S. PATENT DOCUMENTS

| 3,660,646 | 5/1972 | Minero et al. | 364/740 |
| 4,682,303 | 7/1987 | Uya | 364/788 |
| 4,704,701 | 11/1987 | Mazin et al. | 364/788 |
| 4,764,888 | 8/1988 | Holden et al. | 364/788 |

Primary Examiner—David H. Malzahn
Attorney, Agent, or Firm—Sughrue, Mion, Zinn, Macpeak & Seas

[57] ABSTRACT

A carry select adder may be used in which carry inputs to ripple adder stages are not fixed. The adder stage determines which of the two ripple adders of that stage has output the correct sum while the variable carry input is equal to a given value. Then the variable carry input value is switched to a different value and the adder stage determines the correct output sum from the other ripple adder. The adder performs self-checking by comparing these two sums to ensure that the output sum is accurate.

17 Claims, 7 Drawing Sheets

FIG. 3

FIG. 4
ADDER TIMINGS:

13 % INCREASE IN AREA

HIGH PERFORMANCE SELF-CHECKING ADDER HAVING SMALL CIRCUIT AREA

BACKGROUND OF THE INVENTION

The present invention relates to an adder which has a high performance and is self-checking without requiring a large amount of circuit overhead.

In data operations of a computer system, the ADD operation is the most frequently performed operation in the data path of the processor unit. The performance (or speed) of this operation mainly depends on the carry propagation scheme implemented in the design of the adder. However, in order to provide a real-time error detection, self-checking of the ADD operation is very desirable in many high reliability systems. For an n-bit ADD operation where n is very large a carry lookahead scheme may be used to reduce the carry propagation delay from n stages to log (n) stages. However, no adder has been previously designed in which high performance and self-checking are accomplished without requiring too large an amount of circuit overhead.

U.S. Pat. No. 4,737,926 (Vo et al.) teaches an implementation of a carry lookahead scheme for adder design. Large bit groups are used in the middle of the lookahead circuit while shorter bit groups are used at the ends to reduce carry propagation delay (e.g., 3-4-5-6-5-4-3-2 bit partition shown in FIG. 5.)

U.S. Pat. No. 4,718,034 (Takla et al.) teaches a carry-save propagation adder implemented using exclusive-OR blocks.

U S. Pat. No. 4,718,035 (Hara et al.) shows a simple circuit in bipolar technology which can perform carry select operation.

U.S. Pat. No. 4,525,797 (Holden); U.S. Pat. No. 4,763,295 (Yamada et al.); U.S. Pat. No. 4,682,303 (Uya): and U.S. Pat. No. 4,845,655 (Yamada et al.) discuss the basic idea of using a carry select scheme, to achieve high performance parallel adding. Circuit implementation and various block partitions are presented as to the carry select adder design.

In all previous carry select schemes (including those mentioned above), carry inputs to adder blocks are constant and the carry generated from each block is only used to select pre-computed sum outputs from a higher-order block. No adder has previously been designed in which both high performance and self-checking are accomplished without requiring too large an amount of circuit overhead.

SUMMARY OF THE INVENTION

The present invention is a novel self-checking adder in which a carry select adding design is used. This adder provides high performance while requiring a very low circuit overhead.

A variable CARRY signal and its inverse are used as carry inputs to each ripple carry stage. Thus, additions in each ripple carry adder are performed twice, once with one carry input value and a second time with an opposite carry input value. The correct sum from one of the two ripple adders of a stage is determined by a carry signal from a previous stage while CARRY=1. Then CARRY is switched to "0" and the correct sum is provided from the other ripple adder. These two sums are compared to check the accuracy of the ADDER circuitry.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figures 1, 1A:
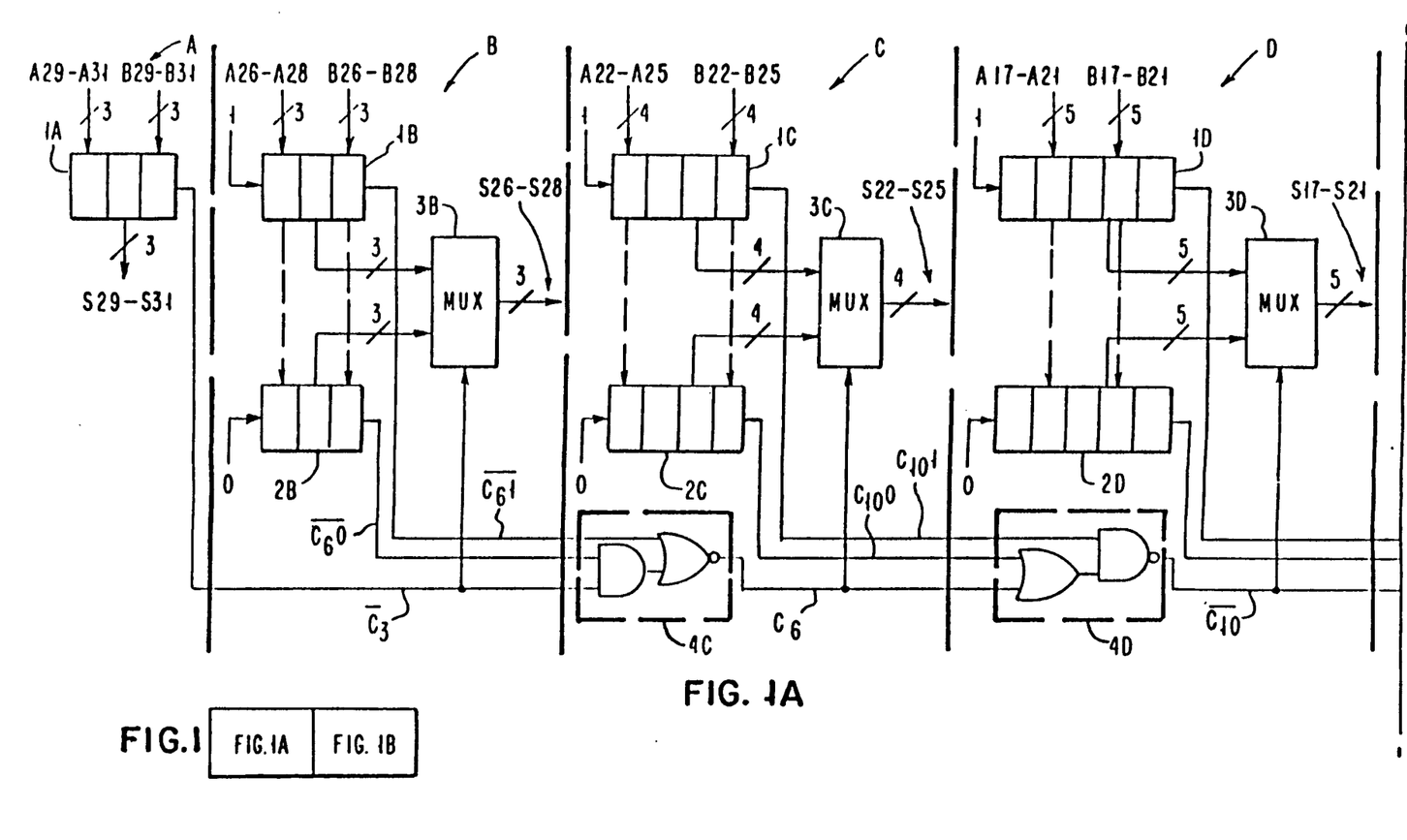
FIGS. 1, 1A and 1B illustrate a 32-bit carry select adder.
Figure 1B:
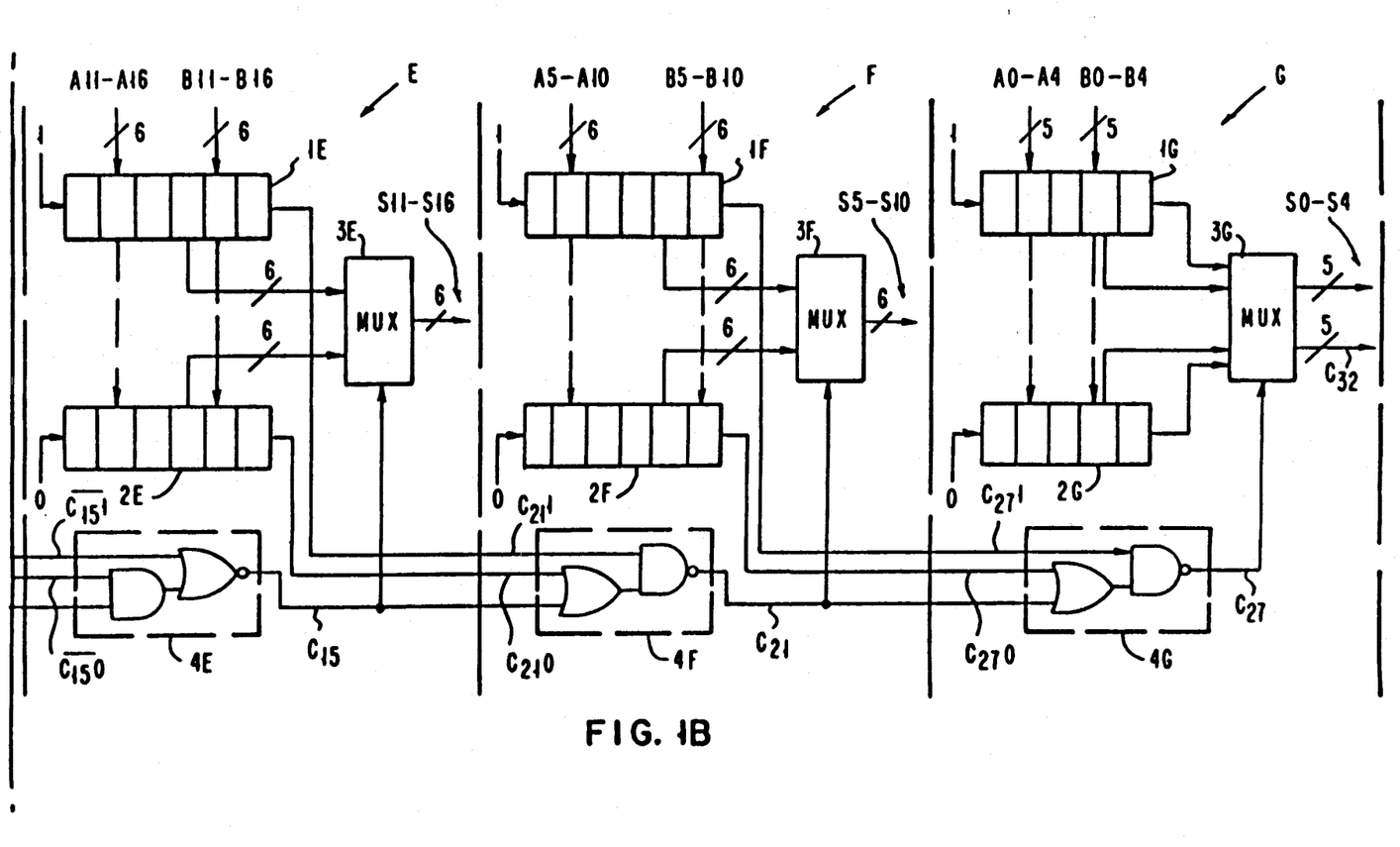

FIG. 1 shows a 32-bit carry select adder. A first ripple carry adder structure includes ripple adders 1A, 1B, 1C, 1D, 1E, 1F and 1G which add 3 bits. 3 bits, 4 bits, 5 bits, 6 bits, 6 bits and 5 bits, respectively, for a total of 32 bits. A second ripple carry adder structure includes adders 2B, 2C, 2D, 2E, 2F and 2G, respectively. The first ripple carry adder structure uses a one carry-in. That is, a one bit is carried into each of adders 1B, 1C, 1D, 1E, 1F and 1G. Adders 2B-2G add the same bits as adders 1B-1G, respectively, except that these adders use a zero carry-in. Thus the additions can be performed simultaneously in ripple adders 1A, 1B and 2B; 1C and 2C; 1D and 2D; 1E and 2E; 1F and 2F; and 1G and 2G; respectively.

When the carry from the previous stage is available, it is used to select which of the respective adder outputs should be used as the correct sum for those bits. For example, adder 1B is used to add bits A26-A28 to bits B26-B28 with an assumed carry-in of "1" and adder 2B is used to add these same bits with an assumed carry-in of "0". These additions can take place at the same time as bits A29-A31 are added to bits B29-B31 in adder 1A to provide output sum S29-S31. The carry-out of adder 1A is used as an input to multiplexer 3B to select the sum output from either adder 1B or adder 2B as the output sum S26-S28. Thus, the multiplexer 3B selects the correct sum S26-S28 after a 3-stage delay without waiting for an additional 3-stage delay. Carry lookahead cells 4C, 4D, 4E, 4F and 4G are used to form the carry-in for each stage in response to the previous carry-in and the stage carries from each of the respective ripple adders of the ripple carry adder structures.

Each of the successive ripple adders in FIG. 1 is extended by one bit to account for the delay in the carry lookahead gate. For example, the carry-out of each of ripple adders 1A, 1B and 2B would have a 3 stage delay. Therefore, since each of these carry-outs is input to carry lookahead cell 4C, the output of this carry lookahead cell 4C would have a 4 stage delay. Therefore, adders 1C and 2C may be 4 bit adders with carry-outs having a 4 stage delay.

Since the 32-bit carry select adder shown in FIG. 1 is partitioned into 3-3-4-5-6-6-5 bit ripple adder pairs, the entire carry select adder has approximately a 9 stage delay.

Advantages of using the carry select adder shown in FIG. 1 are that the critical paths of the adder are well balanced for optimal performance, the regular design and layout for ripple adders reduce the circuit area and complexity of the design, and the low fan-in/fan-out requirements of the adder logic are best suited for CMOS design implementation.

Figure 2A:
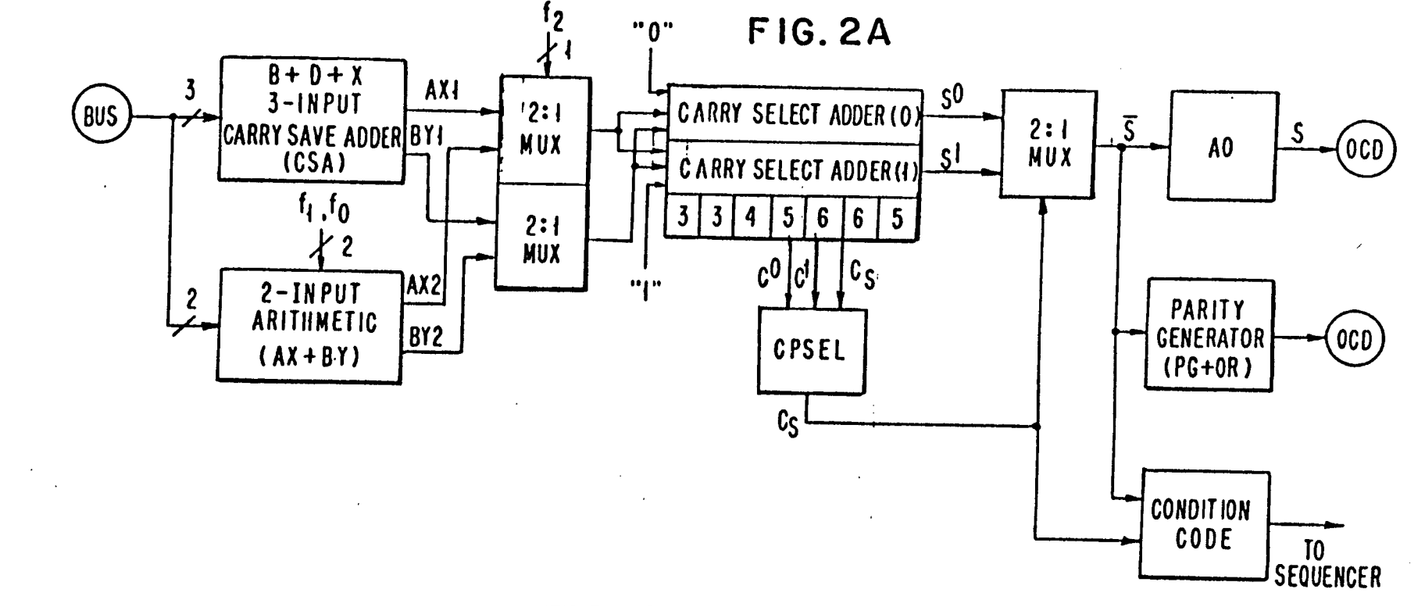
FIG. 2(A) illustrates a 3-input adder unit logic diagram.
Figure 2B:
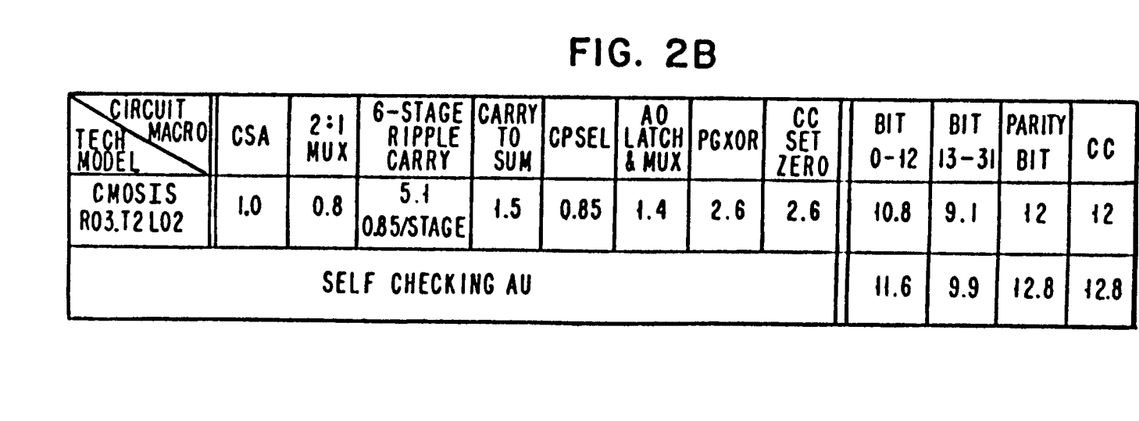
FIG. 2(B) is a diagram showing performance values of the adder shown in FIG. 2(A) designed using CMOSIIS (0.5 μm CMOS) technology.

FIG. 2(A) is a block diagram showing a three input 32 bit adder unit design using the carry select adder shown in FIG. 1. The worst case performance of each circuit macro is shown in FIG. 2(B) based on a design using CMOSIIS (0.5 µm CMOS) technology. For static adder design, this performance is better than those using a carry lookahead design with a comparable circuit size.

In each of the ripple adder stages of the carry select adder of FIG. 1, the carry input is fixed at either 0 or 1 and the sum results are latched as the output sum bits only when the actual carry provided from the previous stage matches the assigned carry. Therefore, there is no self-checking of the selected adder sum by the carry select adder of FIG. 1.

A carry select adder having self-checking of faults is described below with reference to FIGS. 3-6. FIG. 5 shows a 32-bit carry select adder which is different from the carry select adder shown in FIG. 1. A first ripple carry adder structure includes ripple adders 51A, 51B, 51C, 51D, 51E, 51F and 51G and a second ripple carry adder structure includes ripple adders 52A, 52B, 52C, 52D, 52E, 52F and 52G. However, these two ripple carry adder structures do not use fixed carry inputs as in the carry select adder of FIG. 1. The fixed carry inputs are replaced by a variable signal (i.e., "CARRY").

Figure 4:
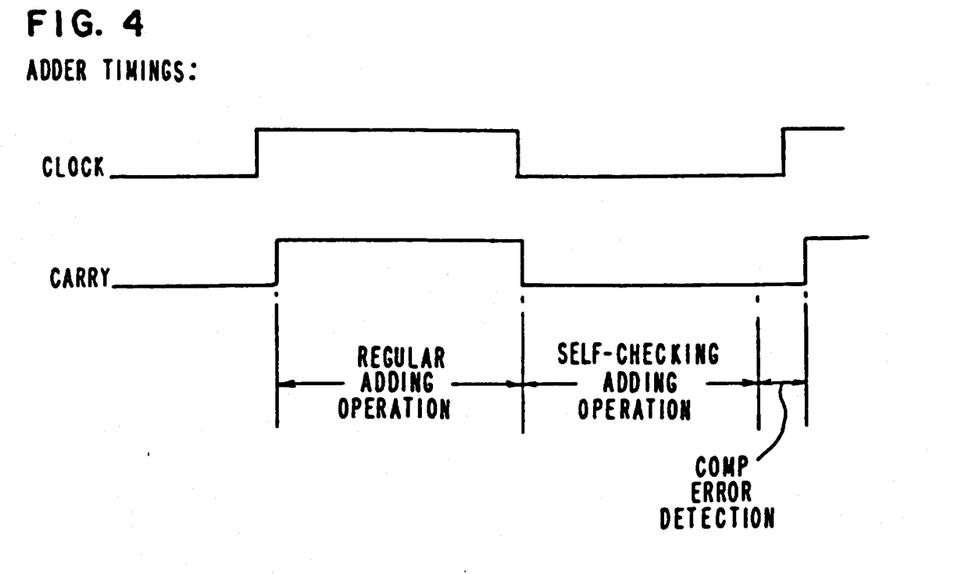
FIG. 4 illustrates a timing diagram for describing the operation of a self-checking carry select adder.
Figures 5, 5A:
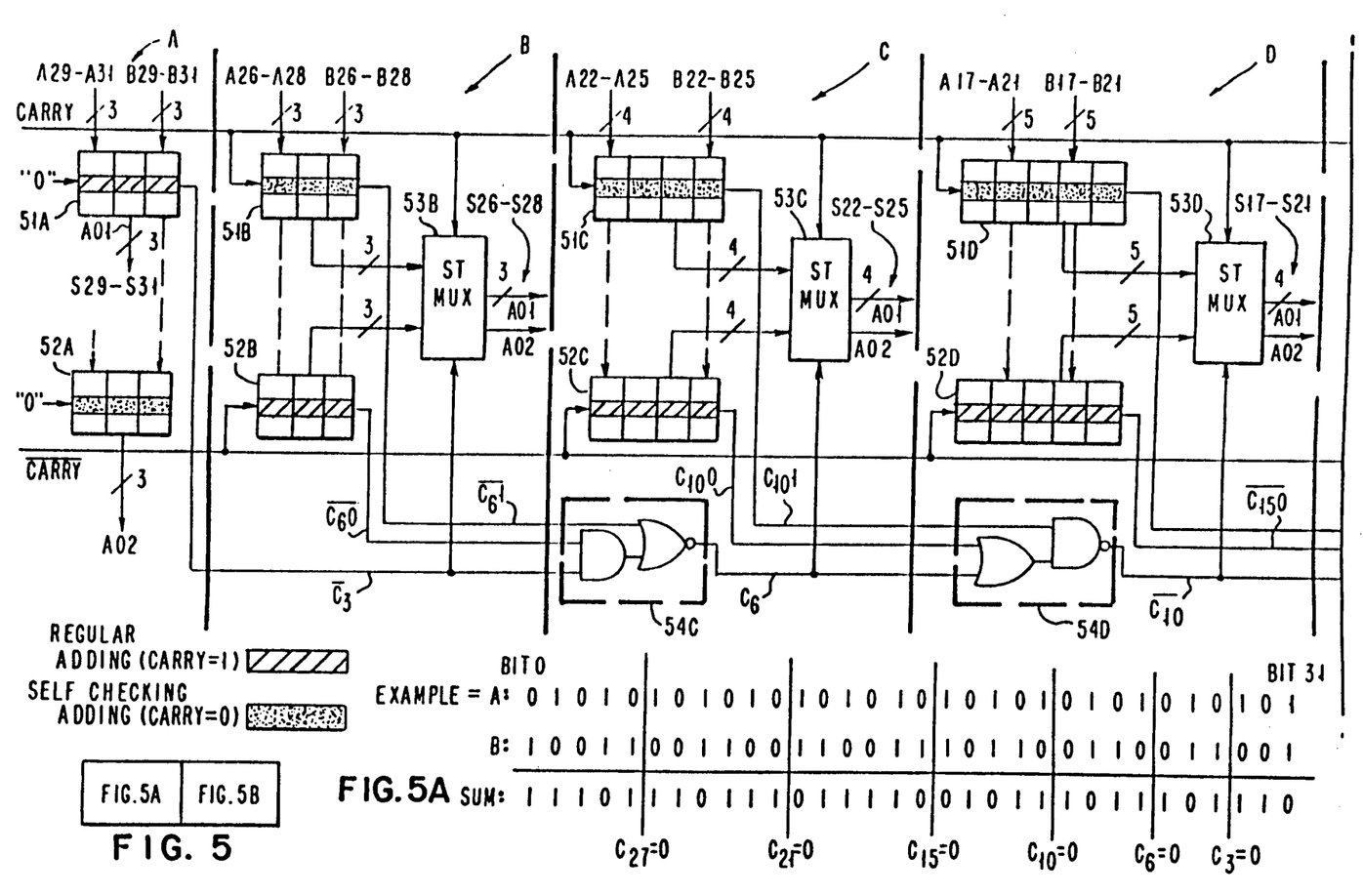
FIGS. 5, 5A and 5B illustrate a 32-bit carry select adder having variable carry inputs to each ripple adder stage.
Figure 5B:
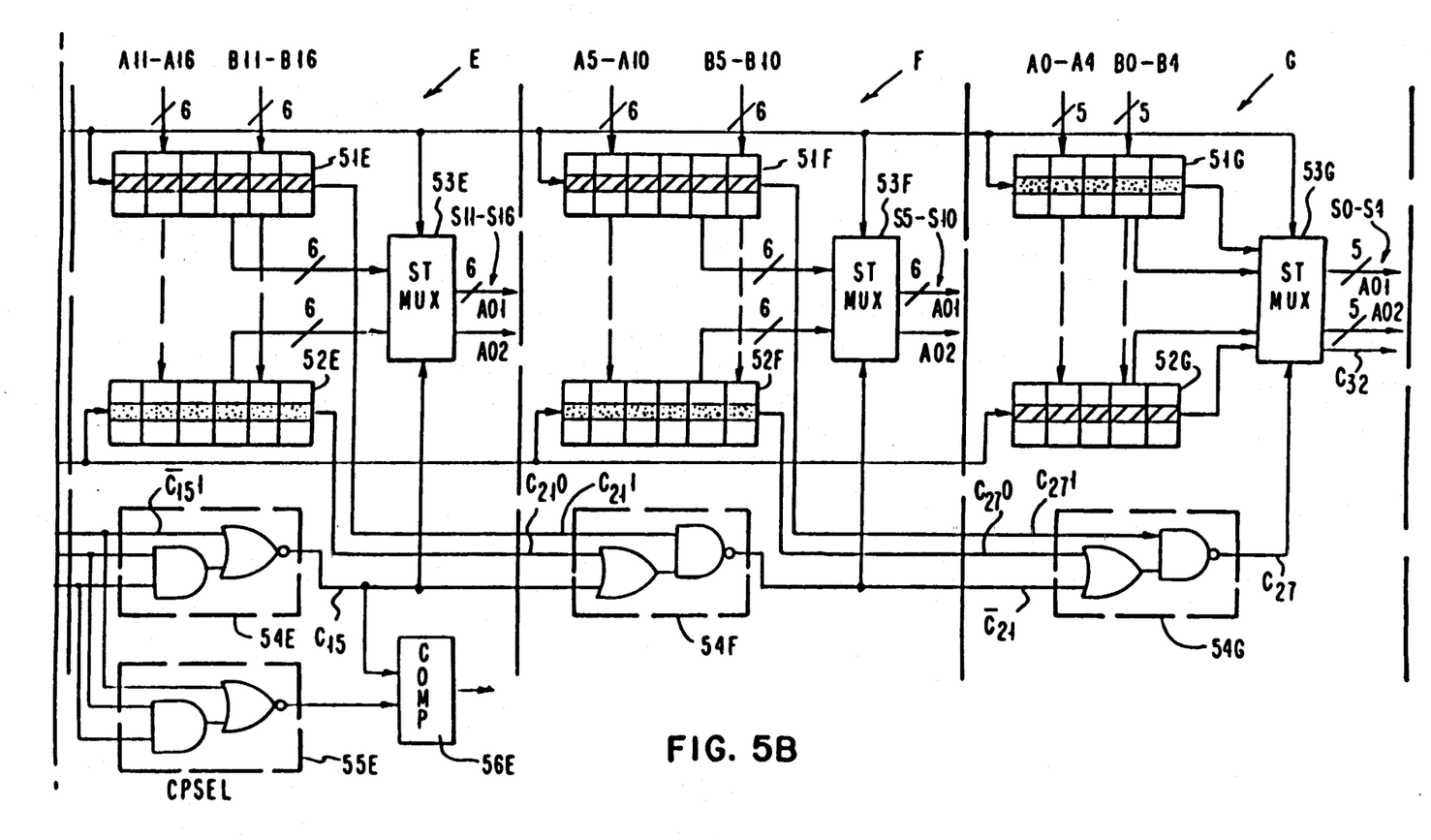

FIG. 4 shows the timing of the clock and CARRY signals used for the adders shown in FIG. 5. As described in more detail below, a regular adding operation is performed while CARRY=1 and a self-checking adding operation is performed when CARRY=0. Then the two results of these additions are compared to check for faults in the adder circuitry.

Figure 3:
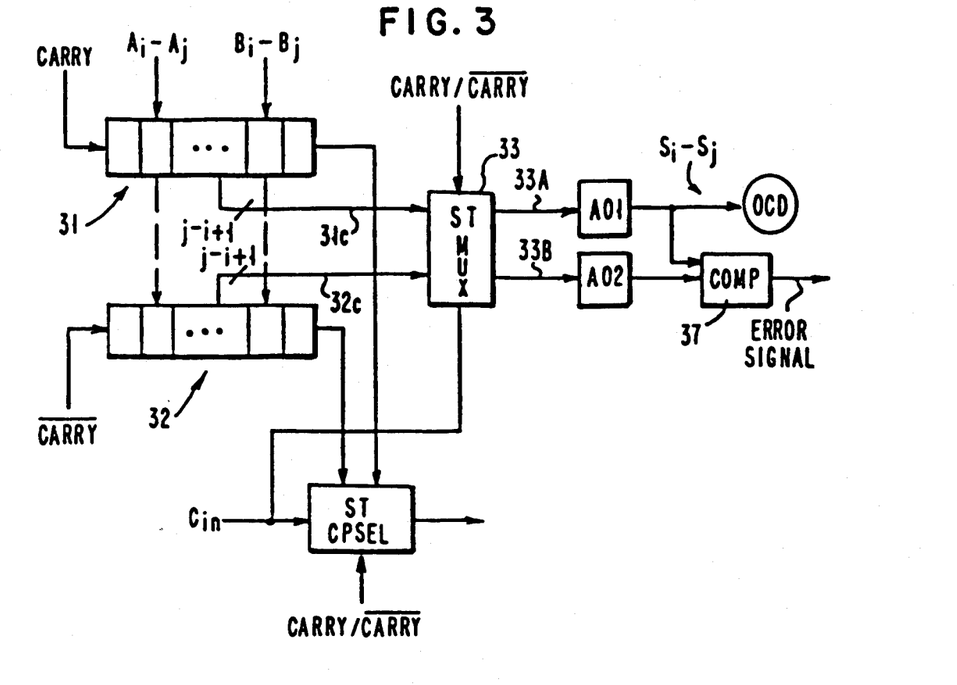
FIG. 3 illustrates self-checking adder circuitry for an adder such as the one shown in FIG. 5.

FIG. 3 shows self-checking adder circuitry which can be used in the carry select adder of FIG. 5. In each stage, each of the ripple adders 31 and 32 adds Ai-Aj to Bi-Bj. These adders first perform the addition while the CARRY signal is equal to 1. The output STMUX 33 provides the correct sum to latch A01 when CARRY=1. Therefore when CARRY=1, and Cin=1, the sum 31c output from adder 31 is provided to latch A01 on line 33A. When CARRY=1 and Cin=0, however, the sum 32c output from adder 32 is provided to latch A01 on line 33A. After the appropriate sum has been provided to latch A01, the CARRY signal is toggled to "0" and adders 31 and 32 perform a second addition operation with carry-ins equal to 0 and 1, respectively. The output STMUX 33 provides the correct sum to latch A02 when CARRY=0. When CARRY=0, and Cin=1, STMUX 33 provides the sum 32c from adder 32 to latch A02 via line 33B. When CARRY=0 and Cin=0, STMUX 33 provides the sum 31c from adder 31 to latch A02. Thus, the sum latched in latch A01 is always a sum produced from a different adder than the sum latched in latch A02. For example if Cin=1, the sum latched in latch A01 is the sum produced by adder 31 and the sum latched in latch A02 is the sum produced by adder 32. Alternately, if Cin=0, the sum latched in latch A01 is the sum produced by adder 32 and the sum latched in latch A02 is the sum produced by adder 31.

The sums stored in latches A01 and A02 are compared by comparator 37. If these two sums are not equal comparator 37 outputs an error signal. Thus, any single fault in a ripple carry stage can be detected by comparing A01 and A02 for that stage. The sum latched in latch A01 is used as the sum output Si-Sj of the adder stage.

Carry Propagation Select (CPSEL) cell 34 is similar to the carry cells 4C, 4D, 4E, 4F and 4G shown in FIG. 1. In addition, the CARRY signal and/or it's inverse are input to CPSEL cells 34 and 54C-54G shown in FIGS. 3 and 5. There is no significant downgrade in performance since the extra circuitry required to include the CARRY signal as an input to the macro is very basic and does not create any significant excess delays.

The self-checking circuitry described above is able to detect all fault conditions except those in the CPSEL macro. However, five CPSEL cells are necessary in a 32-bit adder (e.g.. CPSEL cells 54C, 54D, 54E, 54F and 54G shown in FIG. 5). Therefore, self-checking of faults in the CPSEL cells can be accomplished using a duplicate CPSEL cell and a comparator (e.g.. CPSEL cell 55E and comparator 56E) without creating too much overhead.

Figure 6:
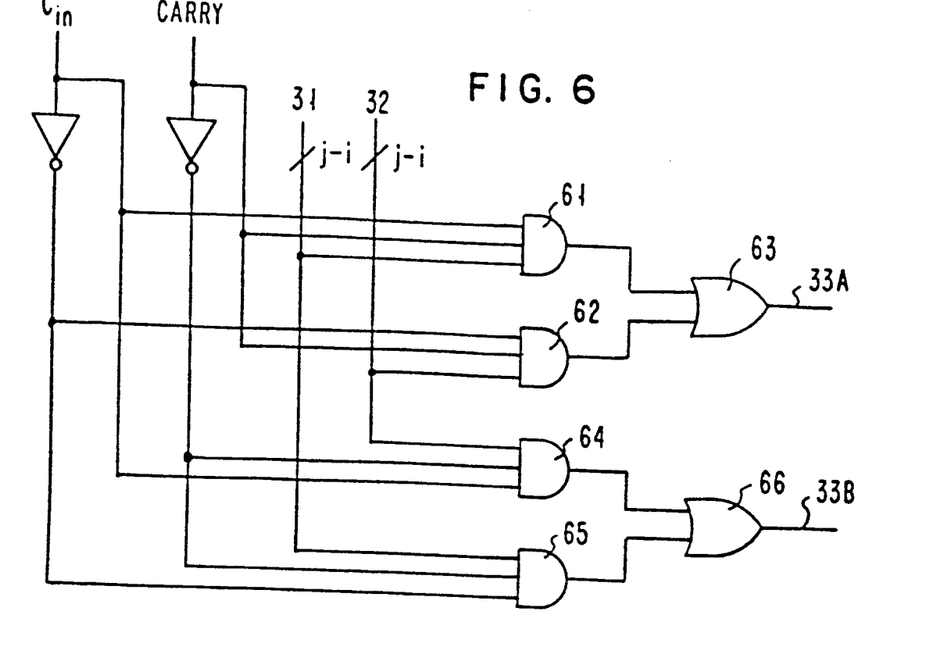
FIG. 6 illustrates a logic circuit which could be used to design the multiplexers shown in FIGS. 3 and 5.

Logic circuitry which could be used to design the STMUX 33 shown in FIG. 3 or any or all of the STMUXs 53B, 53C, 53D, 53E, 53F and 53G shown in FIG. 5 is shown in FIG. 6.

The input and output signals shown in FIG. 6 correspond to the identically-named signals shown in FIG. 3.

When CARRY=1 and Cin=1, the sum on line 31c is output on line 33A. When CARRY=1 and Cin=0, the sum on line 32c is output on line 33A. When CARRY=0 and Cin=0, the sum on line 31c is output on line 33B. When CARRY=0 and Cin=1, the sum on line 32c is output on line 33B.

Gate 61 is an AND gate which provides the sum on line 31c through OR gate 63 to output line 33A when Cin=1 and CARRY=1. AND gate 62 provides the sum on line 32c through OR gate 63 to output line 33A when Cin=0 and CARRY=1.

AND gate 64 provides the sum on line 32c through OR gate 66 to output line 33B when Cin=1 and CARRY=0. AND gate 65 provides the sum on line 31c through OR gate 66 to output line 33B when Cin=0 and CARRY=0.

Figure 7A:
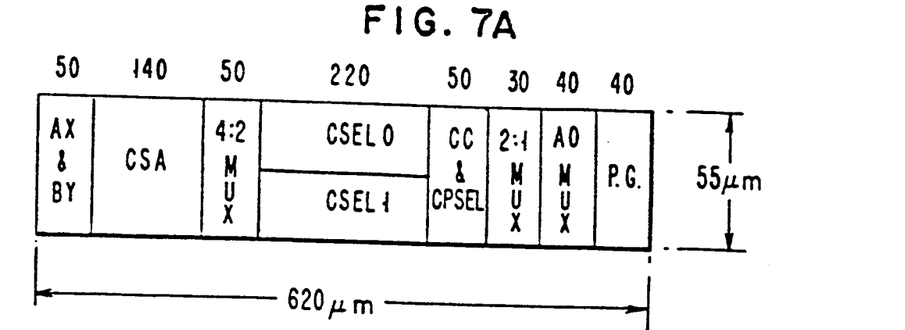
FIGS. 7(A) and 7(B) illustrate circuit areas of a 3-input adder unit and a 3-input adder unit with self-checking, respectively.
Figure 7B:
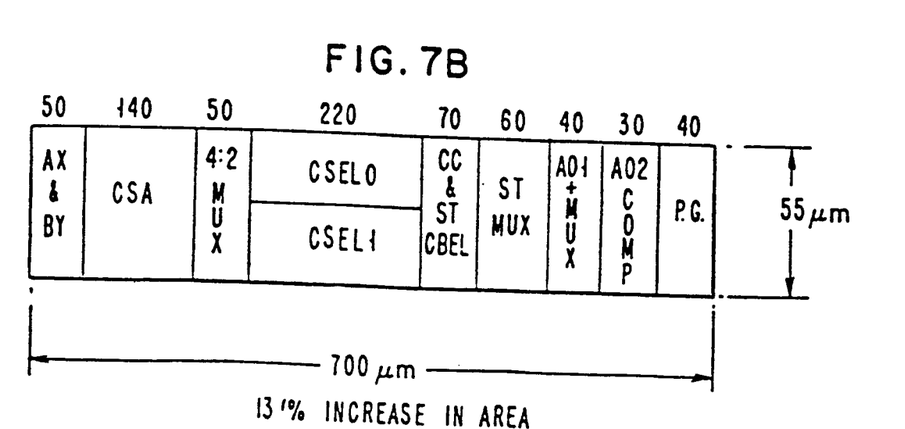

FIGS. 7(A) and 7(B) illustrate estimated circuit areas based on a practical layout of the regular carry select adder and the self-checking carry select adder, respectively. The increase in area for the self-checking adder over the area required for the regular carry select adder is only approximately 13%.

The above-described self-checking adder design has a very low overhead which is not dependent on the technology used. Additionally, this design is better in performance than designs using a carry lookahead scheme based on CMOS design.

It will be apparent to those of working skill that modifications of this invention may be practiced without departing from the essential scope of this invention.

What is claimed is:

1. A circuit for checking for faults in an adder stage having a first ripple adder and a second ripple adder said first ripple adder having a variable carry input and said second ripple adder having a carry input opposite that of said first adder, said checking circuit comprising:
   means for selecting an output of one of said ripple adders in response to said variable carry input and to a carry output from a previous stage;
   first means for storing said selected output when said variable carry input is equal to a first value;
   second means for storing said selected output when said variable carry input is equal to a second value; and
   means for providing an error signal in response to said stored outputs.

2. A circuit as claimed in claim 1, wherein said error signal providing means comprises a comparator.

3. A circuit as claimed in claim 1, wherein said carry output from said previous stage is determined by a first carry propagation select circuit which is responsive to carry outputs from first and second ripple adders of said previous stage, to a carry output from a stage prior to said previous stage, and to said variable carry input.

4. A circuit as claimed in claim 3, wherein said adder stage in which faults are checked further comprises:
   a second carry propagation select circuit connected in parallel with said first carry propagation select circuit; and
   means for providing a second error signal in response to said first and second carry propagation select circuits.

5. A circuit as claimed in claim 4, wherein said second error signal providing means comprises a comparator.

6. A circuit as claimed in claim 1, wherein said selected output stored in said first storing means is provided as sum output bits of said adder stage in which faults are checked.

7. A self-checking adder having a plurality of stages, at least one of said stages comprising:
   a first ripple adder having a variable carry input;
   a second ripple adder having a carry input which is the inverse of said variable carry input;
   means for selecting an output of one of said ripple adders in response to said variable carry input and to a carry output from a previous stage; and
   means for providing a first error signal in response to an output selected by said selecting means when said variable carry input is equal to a first value and in response to an output selected by said selecting means when said variable carry input is equal to a second value.

8. A self-checking adder as claimed in claim 7, wherein said plurality of stages have a varying number of bits.

9. A self-checking adder as claimed in claim 7, wherein said first error signal providing means comprises a comparator.

10. A self-checking adder as claimed in claim 7, wherein a first of said stages comprises:
   a third ripple adder;
   a fourth ripple adder; and
   means for providing an error signal in response to outputs of said third and fourth ripple adders.

11. A self-checking adder as claimed in claim 7, wherein said carry output from said previous stage is determined by a first carry propagation select circuit which is responsive to carry outputs from first and second ripple adders of said previous stage, to a carry output from a stage prior to said previous stage, and to said variable carry input.

12. A self-checking adder as claimed in claim 11, wherein said at least one stage further comprises:
   a second carry propagation select circuit connected in parallel with said first carry propagation select circuit; and
   means for providing a second error signal in response to said first and second carry propagation select circuits.

13. A self-checking adder as claimed in claim 12, wherein said second error signal providing means comprises a comparator.

14. A self-checking adder as claimed in claim 7, wherein said output selected by said selecting means when said variable carry input is equal to said first value is used as a portion of sum output bits output by said self-checking adder.

15. A method for checking for faults in a stage of a self-checking adder, said stage including a first ripple adder and a second ripple adder, said method comprising the steps of:
   (a) providing a variable carry input to said first ripple adder;
   (b) providing a carry input to said second ripple adder which is the inverse of said variable carry input;
   (c) selecting an output of one of said ripple adders in response to said variable carry input and to a carry output from a previous stage;
   (d) inverting said variable carry input;
   (e) repeating steps (a) through (c) with said variable carry input inverted; and
   (f) providing a first error signal in response to said selected outputs.

16. The method claimed in claim 15, further comprising the step of determining said carry output from said previous stage in response to carry outputs from first and second ripple adders of said previous stage, to a carry output from a stage prior to said previous stage, and to said variable carry input.

17. The method claimed in claim 15, further comprising the step of providing one of said selected outputs as sum output bits output by said stage being checked for faults.

* * * * *